(12) United States Patent
Ghosal et al.

(10) Patent No.: US 12,542,673 B2
(45) Date of Patent: Feb. 3, 2026

(54) EFFICIENT METHODS FOR TRUSTED REMOTE PROGRAM EXECUTION

(71) Applicant: NTT Research, Inc., Sunnyvale, CA (US)

(72) Inventors: Riddhi Ghosal, Los Angeles, CA (US); Amit Sahai, Los Angeles, CA (US); Brent Waters, Austin, TX (US)

(73) Assignees: NTT Research, Inc., Sunnyvale, CA (US); The Regents Of The University Of California, Oakland, CA (US)

( * ) Notice: Subject to any disclaimer, the term of this patent is extended or adjusted under 35 U.S.C. 154(b) by 148 days.

(21) Appl. No.: 18/484,436

(22) Filed: Oct. 10, 2023

(65) Prior Publication Data

US 2024/0137222 A1    Apr. 25, 2024

Related U.S. Application Data

(60) Provisional application No. 63/414,694, filed on Oct. 10, 2022.

(51) Int. Cl.
*H04L 9/32* (2006.01)

(52) U.S. Cl.
CPC .................. *H04L 9/3218* (2013.01)

(58) Field of Classification Search
CPC .............................. H04L 9/50; H04L 9/3218
USPC ........................................................... 713/189
See application file for complete search history.

(56) References Cited

U.S. PATENT DOCUMENTS

| | | | |
|---|---|---|---|
| 7,577,852 B2 * | 8/2009 | Okazaki ............... | H04L 9/3247 713/189 |
| 8,132,013 B2 * | 3/2012 | Meier .................... | G06F 21/64 713/181 |
| 11,240,002 B2 * | 2/2022 | Jo ......................... | G06Q 20/065 |
| 2012/0079287 A1 * | 3/2012 | Leclercq ............... | G06F 21/575 713/192 |
| 2012/0151223 A1 * | 6/2012 | Conde Marques ....................... | G06F 21/6218 713/193 |
| 2016/0028721 A1 * | 1/2016 | Buldas .................. | G06F 21/645 713/175 |
| 2021/0233064 A1 * | 7/2021 | Maim .................... | G06Q 20/06 |

* cited by examiner

*Primary Examiner* — Amare F Tabor
(74) *Attorney, Agent, or Firm* — CipherLaw

(57) ABSTRACT

Embodiments include a fully non-interactive publicly-verifiable delegation scheme for committed programs, specifically, a setting where Alice is a trusted author who delegates to an untrusted worker the task of hosting a program P, represented as a Boolean circuit. Alice also commits to a succinct value based on P. Disclosed methods allow an arbitrary user/verifier without knowledge of P to be convinced that they are receiving from the worker an actual computation of Alice's program on a given input x.

18 Claims, 9 Drawing Sheets

The Delegation Setup

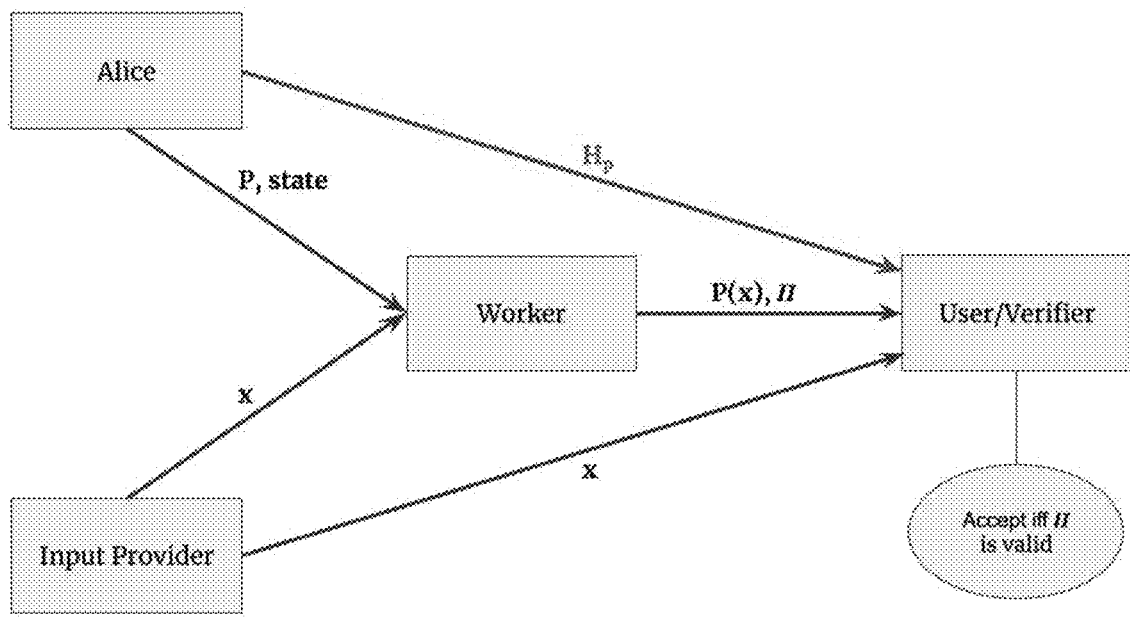
Figure 1: The Delegation Setup

Protocol 1 (Semi-Trusted SNARG).

- stSNARG.Setup($1^\lambda, 1^T$):
    - SE.$K_{even} \leftarrow$ SE.Gen($1^\lambda, 1^{M_{\lambda,T}}, 1^{L_\lambda}$)[a]
    - SE.$K_{odd} \leftarrow$ SE.Gen($1^\lambda, 1^M, 1^L$)
    - BARG.crs $\leftarrow$ BARG.Gen($1^\lambda, 1^{T+1}, 1^{|C_{index}|}$)
    - dk $\leftarrow$ HT.Gen($1^\lambda$)
    - return crs := (SE.$K_{even}$, SE.$K_{odd}$, BARG.crs, dk).

- stSNARG.TrustHash(crs, $P$)
    - (tree$_0^2$, rt$_0^2$) $\leftarrow$ HT.Hash(dk, $P$), $H_P \leftarrow$ rt$_0^2$
    - return $H_P$.

- stSNARG.P(crs, $P, x, y, H_P$):
    - $\square$ := empty string
    - (tree$_0^1$, rt$_0^1$) $\leftarrow$ HT.Hash(dk, $x$), (tree$_0^2$, rt$_0^2$) $\leftarrow$ HT.Hash(dk, $P$), (tree$_0^3$, rt$_0^3$) $\leftarrow$ HT.Hash(dk, $\square$)
    - initialize s with the start state of $\mathcal{TM}$
    - $st_0$ := $(0, 0, 0, s)$
    - $h_0$ := $(st_0, rt_0^1, rt_0^2, rt_0^3)$
    - for every $i = 1$ to $T$,
        - $rt_i^1 \leftarrow rt_{i-1}^1$, $rt_i^2 \leftarrow rt_{i-1}^2$
        - $(l_i^1, l_i^2, l_i^3) \leftarrow$ StepR($st_{i-1}$)
        - $\{(b_i^j, \Pi_i^j) \leftarrow$ HT.Read(tree$_{i-1}^j, l_i^j)\}_{j \in [3]}$
        - $(b_i', l_i', st_i) \leftarrow$ StepW($st_{i-1}, b_i^1, b_i^2, b_i^3$)
        - (tree$_i^3$, rt$_i^3$, $\Pi_i'$) $\leftarrow$ HT.Write(tree$_{i-1}^3, l_i'^3, b_i'^3$)
        - $h_i \leftarrow (st_i, rt_i^1, rt_i^2, rt_i^3)$
    - $A := (h_0, (h_1, \{b_1^j, \Pi_1^j\}_{j \in [3]}, \Pi_1'), \ldots, (h_T, \{b_T^j, \Pi_T^j\}_{j \in [3]}, \Pi_T'))$
    - $c_{even} \leftarrow$ SE.Hash(SE.$K_{even}, A$) and $c_{odd} \leftarrow$ SE.Hash(SE.$K_{odd}, A$)
    - $c := (c_{even}, c_{odd})$
    - $I_x \leftarrow \{[i_1, i_2] | A[i_1, i_2] = x\}$
    - $\rho_{h_0} \leftarrow$ SE.Open(SE.$K_{even}, A, I_{h_0}$)[b]
    - for every $i \leq \lfloor T/2 \rfloor$,
        - for $B \in \{h_{2i}, \{b_{2i}^j, \Pi_{2i}^j\}_{j \in [3]}, \Pi_{2i}'\}$, $\rho_B \leftarrow$ SE.Open(SE.$K_{even}, A, I_B$)
    - for every $i \leq \lfloor T/2 \rfloor$,
        - for $B \in \{h_{2i+1}, \{b_{2i+1}^j, \Pi_{2i+1}^j\}_{j \in [3]}, \Pi_{2i+1}'\}$, $\rho_B :=$ SE.Open(SE.$K_{odd}, A, I_B$)
    - Let $C_{index}$ be as defined in Figure 3
    - $\Pi :=$ BARG.P $\left(\text{crs}, C_{index}, h_0, \{h_{i-1}, h_i, \{b_i^j, \Pi_i^j\}_{j \in [3]}, \Pi_i', \rho_{h_{i-1}}, \rho_{h_i}, \{\rho_{b_i^j}, \rho_{\Pi_i^j}\}_{j \in [3]}, \rho_{\Pi_i'}\}_{i \in [T]}\right)$
    - return $(c, \Pi)$.

- stSNARG.V(crs, $(x, y), H_P, (c, \Pi)$):
    - Compute $C_{index}$
    - return 1 if and only if BARG.V(BARG.crs, $C_{index}, \Pi$) = 1.

---

[a] $M_{\lambda, T} = O(T \text{ poly}(\lambda))$ and $L_\lambda = O(\text{poly}(\lambda))$ are arbitrary and efficiently computable values which can be fixed in advance and hardcoded to the Setup algorithm during instantiation. We ignore the subscripts and often use $M$ and $L$ for simpler notation.

[b] Note that for simplification, we abuse notation here by specifying opening to more than a single bit.

Figure 2: Semi-Trusted SNARG

Circuit 1 (Circuit $C_{\text{index}}$).

- Hard-coded: $y, c, \text{start}, \phi, \text{SE}.K_{\text{even}}, \text{SE}.K_{\text{odd}}, T, H_P, H_x := \text{HT.Hash}(dk, x)$
- Input:

$\left(i, (\mathsf{h}_i := (\text{st}_i, \text{rt}_i^1, \text{rt}_i^2, \text{rt}_i^3), \rho_{\mathsf{h}_i})\right)$, if $i = 0$ $\left(i, (\{\mathsf{h}_{i-1}, \mathsf{h}_i, \{b_i^j, \Pi_i^j\}_{j \in [3]}, \Pi_i', \rho_{\mathsf{h}_{i-1}}, \rho_{\mathsf{h}_i}, \{\rho_{b_i^j}, \rho_{\Pi_i^j}\}_{j \in [3]}, \rho_{\Pi_i'}\})\right)$, $\forall i \in [T]$

- Output: return 1 if and only if
  - if $i = 0$
    a. $\text{st}_0 = \text{start}$
    b. $H_x = \text{rt}_0^1$
    c. $H_P = \text{rt}_0^2$
    d. $\text{HT.Hash}(dk, \square)$ has $\text{rt}_0^3$ as root
  - else
    * if $i$ is even:
      a. $\text{SE.Verify}(\text{SE}.K_{\text{odd}}, c_{\text{odd}}, \mathsf{h}_{i-1}, \rho_{\mathsf{h}_{i-1}}) = 1$
      b. $\text{SE.Verify}(\text{SE}.K_{\text{even}}, c_{\text{even}}, \mathsf{h}_i, \rho_{\mathsf{h}_i}) = 1$
      c. $\left\{\text{SE.Verify}(\text{SE}.K_{\text{even}}, c_{\text{even}}, b_i^j, \rho_{b_i^j}) = 1\right\}_{j \in [3]}$
      d. $\left\{\text{SE.Verify}(\text{SE}.K_{\text{even}}, c_{\text{even}}, \Pi_i^j, \rho_{\Pi_i^j}) = 1\right\}_{j \in [3]}$
      e. $\text{SE.Verify}(\text{SE}.K_{\text{even}}, c_{\text{even}}, \Pi_i', \rho_{\Pi_i'}) = 1$
    * if $i$ is odd:
      a. $\text{SE.Verify}(\text{SE}.K_{\text{even}}, c_{\text{even}}, \mathsf{h}_{i-1}, \rho_{\mathsf{h}_{i-1}}) = 1$
      b. $\text{SE.Verify}(\text{SE}.K_{\text{odd}}, c_{\text{odd}}, \mathsf{h}_i, \rho_{\mathsf{h}_i}) = 1$
      c. $\left\{\text{SE.Verify}(\text{SE}.K_{\text{odd}}, c_{\text{odd}}, b_i^j, \rho_{b_i^j}) = 1\right\}_{j \in [3]}$
      d. $\left\{\text{SE.Verify}(\text{SE}.K_{\text{odd}}, c_{\text{odd}}, \Pi_i^j, \rho_{\Pi_i^j}) = 1\right\}_{j \in [3]}$
      e. $\text{SE.Verify}(\text{SE}.K_{\text{odd}}, c_{\text{odd}}, \Pi_i', \rho_{\Pi_i'}) = 1$
    * $\phi(\mathsf{h}_{i-1}, \mathsf{h}_i, \{b_i^j, \Pi_i^j\}_{j \in [3]}, \Pi_i') = 1$
    * if $i = T$
      a. $\text{HT.Hash}(dk, y)$ has $\text{rt}_T^3$ as root.
      b. $\text{st}_T$ indeed encodes the accept state.

Figure 3: Circuit $C_{\text{index}}$

Algorithm $Step(x, y, P, \text{crs}, i)$

- $\square := \text{empty string}$

- $(\text{tree}_0^1, \text{rt}_0^1) := \text{HT.Hash}(\text{dk}, x)$, $(\text{tree}_0^2, \text{rt}_0^2) := \text{HT.Hash}(\text{dk}, P)$, $(\text{tree}_0^3, \text{rt}_0^3) := \text{HT.Hash}(\text{dk}, \square)$

- initialize s with the start state of $\mathcal{TM}$

- $\text{st}_0 := (0, 0, 0, \text{s})$

- $\bar{\text{h}}_0 := (\text{st}_0, \text{rt}_0^1, \text{rt}_0^2, \text{rt}_0^3)$

- if $i = 0$, return $\bar{S}_0 := (\text{st}_0, \text{rt}_0^1, \text{rt}_0^2, \text{rt}_0^3)$

- else

- for count $= 1$ to $i$, $(l_{\text{count}}^1, l_{\text{count}}^2, l_{\text{count}}^3) \leftarrow \text{StepR}(\text{st}_{\text{count}-1})$ $\{(b_{\text{count}}^k, \Pi_{\text{count}}^k) := \text{HT.Read}(\text{tree}_{\text{count}-1}^k, l_{\text{count}}^k)\}_{k \in [3]}$ $(b_{\text{count}}'^3, l_{\text{count}}'^3, \text{st}_{\text{count}}) := \text{StepW}(\text{st}_{\text{count}-1}, b_{\text{count}}^1, b_{\text{count}}^2, b_{\text{count}}^3)$ $(\text{tree}_{\text{count}}^3, \text{rt}_{\text{count}}^3, \Pi_{\text{count}}') := \text{HT.Write}(\text{tree}_{\text{count}-1}^3, l_{\text{count}}'^3, b_{\text{count}}'^3)$

- $\bar{\text{h}}_i := (\text{st}_i, \text{rt}_i^1, \text{rt}_i^2, \text{rt}_i^3)$

- $\bar{b}_i := (b_i^1, b_i^2, b_i^3)$

- $\bar{l}_i := (l_i^1, l_i^2, l_i^3)$

- $\bar{\text{rt}}_i := \text{rt}_{i-1}^1, \text{rt}_{i-1}^2, \text{rt}_i^3$

- $\bar{\Pi}_i := (\Pi_i^1, \Pi_i^2, \Pi_i^3, \Pi_i')$

- return $\bar{S}_i := (\bar{\text{h}}_i, \bar{b}_i, \bar{\text{rt}}_i, \bar{\Pi}_i)$ Figure 4: Turing Machine $i^{th}$ step.

Protocol 2 (Semi-Trusted Non-Interactive Argument with Zero-Knowledge).

- ZKstSNARG.Setup($1^\lambda, T$) :
  - $\text{crs}_1 \leftarrow \text{stSNARG.Setup}(1^\lambda, 1^T)$
  - $\text{Com}_{\text{bind}}.Key_1 \leftarrow \text{Com.Gen}(1^\lambda)$
  - $\text{Com}_{\text{bind}}.Key_2 \leftarrow \text{Com.Gen}(1^\lambda)$
  - $\text{Com}_{\text{bind}}.Key_3 \leftarrow \text{Com.Gen}(1^\lambda)$
  - $\text{Com}_{\text{bind}}.Key_4 \leftarrow \text{Com.Gen}(1^\lambda), r_4 \leftarrow_\$ \{0,1\}^\lambda, z \leftarrow \text{Com.C}(\text{Com}.Key_4, 0; r_4)$
  - $\text{NIZK.crs} \leftarrow \text{NIZK.Gen}(1^\lambda)$
  - return ($\text{crs}_1, \text{Com}_{\text{bind}}.Key_1, \text{Com}_{\text{bind}}.Key_2, \text{Com}_{\text{bind}}.Key_3, z, \text{NIZK.crs}$).

- ZKstSNARG.TrustHash(crs, $P$)
  - $H_P \leftarrow \text{stSNARG.TrustHash}(\text{crs}, P)$
  - $r_1 \leftarrow_\$ \{0,1\}^\lambda, C_P \leftarrow \text{Com.C}(\text{Com}_{\text{bind}}.Key_1, H_P; r_1)$ return (SOut $:= (P, r_1)$, POut $:= C_P$).

- ZKstSNARG.P(crs, $x, y$, SOut, POut) :
  - $(c, \Pi) \leftarrow \text{stSNARG.P}(\text{crs}, x, y, H_P)$
  - $r_2 \leftarrow_\$ \{0,1\}^\lambda, c.\text{com} \leftarrow \text{Com.C}(\text{Com}_{\text{bind}}.Key_2, c; r_2)$
  - $r_3 \leftarrow_\$ \{0,1\}^\lambda, \Pi.\text{com} \leftarrow \text{Com.C}(\text{Com}_{\text{bind}}.Key_3, \Pi; r_3)$
  - $\text{NIZK.}\Pi \leftarrow \text{NIZK.Prove}(\text{NIZK.crs}, (c.\text{com}, \Pi.\text{com}, (\text{crs}, x, y, T), C_P), ((H_P, r_1), (c, r_2), (\Pi, r_3), \bot))$
  - return ($c.\text{com}, \Pi.\text{com}, \text{NIZK.}\Pi$).

- ZKstSNARG.V(crs, $(x, y)$, POut $= C_P, c.\text{com}, \Pi.\text{com}, \text{NIZK.}\Pi$) :
  - return 1 if and only if $\text{NIZK.V}(\text{NIZK.crs}, (c.\text{com}, \Pi.\text{com}, (\text{crs}, x, y, T), C_P), \text{NIZK.}\Pi) = 1$.

Figure 5: Semi-Trusted Universal Turing Machine Delegation with Non Interactive Zero-Knowledge

Circuit 2 (Circuit $C'_{\text{index}}$).
- Hard-coded: $y$, start, $\phi$, SE.$K_{\text{even}}$, SE.$K_{\text{odd}}$, $T$, $H_x$ := HT.Hash(dk, $x$)
- Input:

$\left(i, (c, H_P, h_i := (\text{st}_i, \text{rt}_i^1, \text{rt}_i^2, \text{rt}_i^3), \rho_{h_i})\right)$, if $i = 0$ $\left(i, (c, H_P, \{h_{i-1}, h_i, \{b_i^j, \Pi_i^j\}_{j \in [3]}, \Pi_i', \rho_{h_{i-1}}, \rho_{h_i}, \{\rho_{b_i^j}, \rho_{\Pi_i^j}\}_{j \in [3]}, \rho_{\Pi_i'}\})\right)$, $\forall i \in [T]$

- Output: return 1 if and only if
  - if $i = 0$
    a. $\text{st}_0 = \text{start}$
    b. $H_x = \text{rt}_0^1$
    c. $H_P = \text{rt}_0^2$
    d. HT.Hash(dk, □) has $\text{rt}_0^3$ as root
  - else

* if $i$ is even:
       a. SE.Verify(SE.$K_{\text{odd}}, c_{\text{odd}}, h_{i-1}, \rho_{h_{i-1}}) = 1$
       b. SE.Verify(SE.$K_{\text{even}}, c_{\text{even}}, h_i, \rho_{h_i}) = 1$
       c. $\left\{\text{SE.Verify(SE.}K_{\text{even}}, c_{\text{even}}, b_i^j, \rho_{b_i^j}) = 1\right\}_{j \in [3]}$
       d. $\left\{\text{SE.Verify(SE.}K_{\text{even}}, c_{\text{even}}, \Pi_i^j, \rho_{\Pi_i^j}) = 1\right\}_{j \in [3]}$
       e. SE.Verify(SE.$K_{\text{even}}, c_{\text{even}}, \Pi_i', \rho_{\Pi_i'}) = 1$

* if $i$ is odd:
       a. SE.Verify(SE.$K_{\text{even}}, c_{\text{even}}, h_{i-1}, \rho_{h_{i-1}}) = 1$
       b. SE.Verify(SE.$K_{\text{odd}}, c_{\text{odd}}, h_i, \rho_{h_i}) = 1$
       c. $\left\{\text{SE.Verify(SE.}K_{\text{odd}}, c_{\text{odd}}, b_i^j, \rho_{b_i^j}) = 1\right\}_{j \in [3]}$
       d. $\left\{\text{SE.Verify(SE.}K_{\text{odd}}, c_{\text{odd}}, \Pi_i^j, \rho_{\Pi_i^j}) = 1\right\}_{j \in [3]}$
       e. SE.Verify(SE.$K_{\text{odd}}, c_{\text{odd}}, \Pi_i', \rho_{\Pi_i'}) = 1$

* $\phi(h_{i-1}, h_i, \{b_i^j, \Pi_i^j\}_{j \in [3]}, \Pi_i') = 1$
    * if $i = T$
       a. HT.Hash(dk, $y$) has $\text{rt}_T^3$ as root.
       b. $\text{st}_T$ indeed encodes the accept state.

Figure 6: Circuit $C'_{\text{index}}$

Protocol 3 (NIZK Simulator Sim := (Sim$_1$, Sim$_2$)).

- Sim$_1(1^\lambda, 1^T)$ :
  - SE.$K_{even}$ ← SE.Gen($1^\lambda, 1^{M_\lambda \cdot T}, 1^{L_\lambda}$)
  - SE.$K_{odd}$ ← SE.Gen($1^\lambda, 1^M, 1^L$)
  - BARG.crs ← BARG.Gen($1^\lambda, 1^{T+1}, 1^{|C_{index}|}$)
  - dk ← HT.Gen($1^\lambda$)
  - Com$_{bind}$.$Key_1$ ← Com.Gen($1^\lambda$)
  - Com$_{bind}$.$Key_2$ ← Com.Gen($1^\lambda$)
  - Com$_{bind}$.$Key_3$ ← Com.Gen($1^\lambda$)
  - Com$_{bind}$.$Key_4$ ← Com.Gen($1^\lambda$), $r_4$ ←$^\$$ $\mathbb{N}$, $z$ ← Com.C(Com.$Key_4, 1; r_4$)
  - NIZK.crs ← NIZK.Gen($1^\lambda$)
  - return crs := (SE.$K_{even}$, SE.$K_{odd}$, BARG.crs, dk, Com$_{bind}$.$Key_1$, Com$_{bind}$.$Key_2$, Com$_{bind}$.$Key_3$, $z$, NIZK.crs).

and aux := $r_4$

- Sim$_2$(crs, aux, $(x, y)$, POut := $C_P$) :
  - $r_2$ ←$^\$$ $\{0, 1\}^\lambda$, c.com ← Com.C(Com$_{bind}$.$Key_2, 0; r_2$)
  - Generate a dummy proof $\hat{\Pi}$
  - $r_3$ ←$^\$$ $\{0, 1\}^\lambda$, Π.com ← Com.C(Com$_{bind}$.$Key_3, 0; r_3$)
  - NIZK.Π ← NIZK.Prove (NIZK.crs, ($c$.com, Π.com, (crs, $x, y, T$), $C_P$), ($\bot, \bot, \bot$, aux))
  - return ($c$.com, Π.com, NIZK.Π).

Figure 7: Non Interactive Zero Knowledge Simulator

EFFICIENT METHODS FOR TRUSTED REMOTE PROGRAM EXECUTION

CROSS-REFERENCE TO RELATED APPLICATION

This application claims the benefit of U.S. Provisional Application Ser. No. 63/414,694 filed Oct. 10, 2022, the content of which is incorporated by reference herein in its entirety.

FIELD OF THE INVENTION

The invention relates to efficient protocols for verifying remote computations, with particular application for cloud-based services and mobile environments.

BACKGROUND OF THE INVENTION

We consider a scenario where a trusted software author Alice wishes to make it possible for a set of users to make use of her program P, which we treat as a (non-uniform) Boolean circuit. In particular, this program P may have embedded within it a large proprietary database that Alice's program makes use of. However, Alice neither wants to release her program P nor does she want to host and execute the program herself. Instead she wishes to delegate this computation to an untrusted Worker, and the User/Verifier wants to be certain that they are receiving an output obtained via a computation of Alice's actual program P.

What we have just described is one of the most challenging variants of the classical problem of publicly verifiable delegation which has been the subject of intense work for decades, for many relaxed variations of the model that we describe above.

Specifically, delegation schemes without public verification based on standard assumptions for deterministic and non-deterministic computations have been designed. Restricting verification to a designated verifier implies that the worker needs to produce a fresh proof unique for each particular verifier for any computation, which is certainly not ideal. Other prior work achieves public verification but does not achieve public delegation. In other words, the input provider needs to run a pre-processing algorithm corresponding to the program P before being able to delegate.

With regard to non-interactive publicly verifiable delegation, starting from the seminal work on computationally sound proofs by Micali in the random oracle model, there have been several constructions on publicly verifiable non-interactive delegation schemes based on the Random Oracle Model or non-standard knowledge assumptions. From more standard assumptions, there have been several works. An illustrative example is work that proposed the first publicly verifiable non-interactive delegation scheme from a falsifiable decisional assumption on groups with bilinear pairings. However, in contrast with the setting described above, they can only achieve succinct delegation when the Verifier knows the program P. In the setting of Boolean circuits, this trivializes the delegation problem, since reading P's description takes as long as evaluating P. Indeed, the case that we consider—where Alice's program is large—is extremely well motivated: the program P could be an ML model with billions of painstakingly learned parameters.

The SNARGs for $\mathcal{NP}$ barrier.

Constructing a protocol that caters to the fully non-interactive setting defined above has been elusive. Note that in this problem, the User/Verifier and Input Provider do not know the program P. Hence, from User/Verifier's perspective, P is an $\mathcal{NP}$ witness. Thus, it certainly seems that finding a solution is intricately related to a major goal in the area of non interactive succinct proof systems, i.e., SNARGs for $\mathcal{NP}$. Unfortunately, the only known constructions of SNARGs for $\mathcal{NP}$ base their soundness on the Random Oracle Model or non-standard knowledge assumptions. Finding a solution solely relying on standard assumptions has been an open problem for over a decade. Current solutions only achieve SNARGs for $\mathcal{P}$.

Thus, there is a need to enable Non-Interactive Publicly Verifiable Succinct Delegation for Committed Programs without having to use SNARGs for $\mathcal{NP}$.

BRIEF SUMMARY OF THE INVENTION

We present the first complete solution to achieving succinct non interactive publicly verifiable delegation for committed programs. In our setting, only one-way communication is permitted between the parties, as can be seen in the acyclic graph in FIG. 1. Indeed, furthermore, we can also achieve zero-knowledge guarantees as well. Our only computational assumption is the hardness of the Learning with Errors (LWE) problem. We show that SNARGs for $\mathcal{NP}$ are not required to solve this problem, even though the statement being proved looks like an $\mathcal{NP}$ statement to the Verifier.

We show that many ideas from SNARGs for $\mathcal{P}$ can be applied here. Although P is unknown to the User/Verifier, we show that it suffices for Alice to communicate a tiny amount of information of size poly(log |P|) about the program P (referred to as $H_P$) as shown in FIG. 1. Because Alice is the author of P, this $H_P$ can be trusted as correctly generated. Alice does not need to know x to compute $H_P$, hence this achieves public delegation and public verification in the completely non-interactive model described above.

As illustrated in FIG. 1, the way this works according to one example embodiment is:

1. Alice sends the program P along with some computed state to the Worker, and Alice also publishes a succinct hash $H_P$ of her program, which the User/Verifier obtains. This step is done once and for all.
2. An Input Provider chooses an input x, which is sent to both the Worker and the User/Verifier. Note that the input provider could be some public source of information like a news channel of bulletin board, and need not involve the User/Verifier.
3. Finally, the Worker computes the output $y=P(x)$ along with a succinct proof $\Pi$, and sends both of these to the User/Verifier. Steps 2 and 3 may be repeated polynomially many times.

As illustrated in FIG. 1, this process involves no back-and-forth communication. The communication is entirely unidirectional—referred to herein as non-interactive—from left to right. Furthermore, we refer to this scenario as succinct if all communication to the User/Verifier, and the runtime of the User/Verifier, is poly(log |P|, $\lambda$, |x|), where $\lambda$ is a security parameter.

In some embodiments, the Worker is trusted with the program P by Alice, whereas, it is not trusted by the verifier. This asymmetry of trust is inherent in our setup and is well motivated. In a typical real world situation, the verifier is typically a user on the internet who takes part in a one off interaction with a cloud service for some computation. The need to prove honestly in this situation is significant. Alternatively, Alice might be able to have an agreement with the cloud service before handing over her program, which would make it hard for their Worker to breach trust without consequences.

Assuming the hardness of the LWE problem and existence of One-Way functions, FIG. 2 gives a construction for publicly verifiable non-interactive succinct delegation for committed programs with CRS size, proof size and verifier time poly($\lambda$, log |P|, |x|) and prover run time being poly($\lambda$, |P|).

Finally, in order to get zero-knowledge, it suffices for Alice to commit to $H_P$ rather than sending it out in the open. Disclosed herein is a generic transformation to convert any delegation protocol of this form to attain zero-knowledge.

Assuming the hardness of the LWE problem and existence of a succinct delegation scheme, FIG. 5 gives a construction for publicly verifiable succinct delegation scheme with zero knowledge such that CRS size, proof size and verifier time are poly($\lambda$, log |P|) and prover run time is poly($\lambda$, |P|).

Also disclosed herein is how to achieve zero knowledge versions of our delegation scheme, meeting the same strong succinctness and efficiency goals, and under the same assumption (LWE).

Before this work, the only object known to imply this challenging form of delegation was a SNARG/SNARK for $\mathcal{NP}$. This is because from the point of view of the user/verifier, the program P is an unknown witness to the computation. However, constructing a SNARG for $\mathcal{NP}$ remains a major open problem. Herein, it is shown how to achieve delegation in this challenging context assuming only the hardness of the Learning With Errors (LWE) assumption, bypassing the apparent need for a SNARG for $\mathcal{NP}$.

Some embodiments of the invention include systems, methods, network devices, and machine-readable media for a non-interactive method for executing a program at a remote cloud processor such that the result of a computation at the remote cloud processor is trusted, including by, at a program provider module: creating and storing an arbitrary program; creating a succinct hash of the program and providing access to the hash to a remote verifier; transmitting the program to a remote cloud processor, and not transmitting the program to the verifier; at an input provider module: storing an input value for use with the program; transmitting the input value to the remote cloud processor and the verifier; at the remote cloud processor module: executing the program based on the input value to generate an result output; generating a proof, wherein the proof comprises a bitstring and the bitstring having a length that is polylogarithmic with the program size, and wherein the generating of the proof can be accomplished in polynomial time in the program size, and wherein the generated proof is capable of being executed by any arbitrary verifier module; transmitting the result output and the proof to the verifier module; at the verifier module: executing a verifier routine based on the input value, the result output, the proof and the hash of the program to output a binary value representing that the remote cloud processor has generated the result output by executing the program provided by the program provider on the input provided by the input provider; wherein the time required for the verifier routine is polylogarithmic with the program size; and wherein the verifier module does not have a copy of the program, and the verifier module is distinct from the input provider module, and the only the value provided from the input provider to the verifier module is the input value.

In some further embodiments, the input provider module and the verifier module may be configured for operation by the same entity or party. In some further embodiments, the verifier module is computationally and logically distinct from the input provider module. In some further embodiments, the verifier module receives only the hash from program provider module. In some further embodiments, the size of the hash is either independent of a size of the program or is of a fixed size. In some further embodiments, the arbitrary program is represented as a non-uniform boolean circuit. In some further embodiments, the program provider module is an honest party. In some further embodiments, the method is configured to generate the output binary value without executing any further communication steps. In some further embodiments, the method is non-interactive and comprises only unidirectional communications between the modules.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings:

FIG. 1 illustrates an example protocol operating between a prover and a verifier for implementing the claimed systems and methods.

FIG. 2 illustrates an example construction for a publicly verifiable non-interactive succinct delegation for committed programs.

FIG. 3 illustrates an example method with hard coding parameters in an index language circuit.

FIG. 4 illustrates an example method for computing a unique true digest.

FIG. 5 illustrates an example construction for a publicly verifiable succinct delegation scheme.

FIG. 6 illustrates an example circuit.

FIG. 7 illustrates an example protocol.

DETAILED DESCRIPTION OF THE INVENTION

Figure 8:
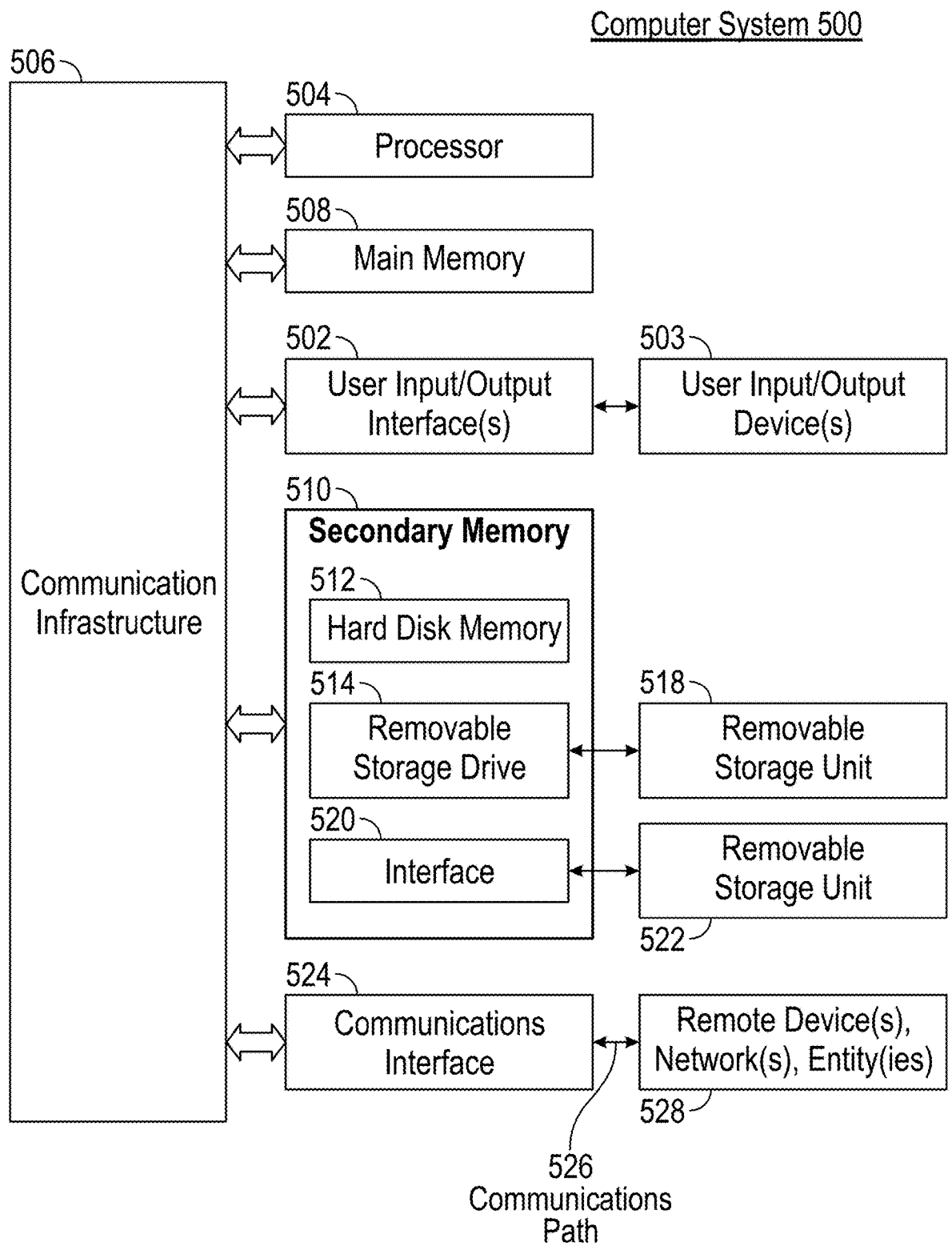
FIG. 8 illustrates an example computer system architecture for implementing the claimed systems and methods.

Delegation Scenario With reference to the setup of our delegation scenario: there are four parties, namely, (1) Alice—the program author ProgAuth who sends a program P and some computed state state to a Worker, (2) an Input Provider I that outputs some value x, (3) Worker W that takes as input (P, state, x) and outputs P(x) and a proof $\Pi$, and (4) User/Verifier V gets as inputs (x, P(x), $\Pi$) and outputs 1 if and only if $\Pi$ was a valid proof. Assume that all the parties get the security parameter $\lambda$ as an input. An additional requirement is that |$\Pi$| and runtime of V is poly($\lambda$, log |P|, |x|), and W runs in time poly($\lambda$, |x|, |P|). Thus, any non-interactive publicly verifiable succinct delegation scheme can be viewed as a collection of four algorithms: sDel=(ProgAuth, W, I, V) with the input output behaviour and efficiency guarantees as specified. Note that this is a $\mathcal{P}$ computation for the Worker but the primary challenge is that the verifier does not have knowledge of the "witness" P, hence this is an $\mathcal{NP}$ computation from the verifier's point of view. Herein, we observe that it is indeed feasible to achieve our delegation scenario for all circuits without having to go through SNARGs for $\mathcal{NP}$. Some embodiments of the technique are based on SNARGs for $\mathcal{P}$.

Challenges of implementing Known Batch Arguments for $\mathcal{NP}$ (BARGs) can be built from LWE. BARGs allow an efficient prover to compute a non-interactive and publicly verifiable "batch proof" of many $\mathcal{NP}$ instances, with size poly(|w| log T) for T-many $\mathcal{NP}$ statements with each witness of size |w|. They begin by looking at P as a Turing machine and the steps of P's computation are interpreted as an Index Circuit $C_{index}$. Say, P terminates in T steps. Formally, they construct a BARG for the Index Language $\mathcal{L}^{index}$, where $$\mathcal{L}^{index} = \{(C_{index}, i) | \exists w_i, \text{ such that } C(i, w_i) = 1\},$$

where $i \in [T]$ is an index. Let $s_0, s_1, \ldots s_T$ denote the encoding of internal states of P along with its tape information, and let Step be its step function such that $\text{Step}(s_{i-1}) = s_i$. The witness for the $i^{th}$ intermediate computation is then defined as $w_i = (s_{i-1}, s_i)$. The index circuit is built such that $(C_{index}, i) \in \mathcal{L}^{index}$ essentially implies that the Turing machine step function was correctly computed on $s_{i-1}$ to yield $s_i$. Note that this alone does not suffice as a proof because the BARG only confirms that $(s_{i-1}, s_i)$ and $(s_i', s_{i+1})$ are valid witnesses. If $s_{i-1}, s_i, s_i', s_{i+1}$ are generated by the step function of the same Turing machine P, they must be consistent with each other, i.e., $s_i = s_i'$. However, this is not guaranteed by a BARG.

To resolve this issue, the prover also sends a Somewhere Extractable Hash (SE) to the witnesses $(s_0, \{s_{i-1}, s_i\}_{i \in [T]})$. The extraction property of this hash allows the verifier to check if the witness of two consecutive BARG instances are indeed consistent with each other. At this stage, we would like to remind the reader of their efficiency goals where crucially, they desire proof size and verification time to be poly($\lambda$, log T). However, note that $|C_{index}|$ grows linearly with $|s_i|$ and the known constructions of SE hashes can only produce hashes with size poly($|s_i|$). This means that total communication and verifier run time will be at least poly ($|s_i|$). This is certainly no good if the Turing machine has massive states. To overcome this final barrier, they make use of Hash Trees which compress the states $s_i$ to a short hash $h_i$ such that $|h_i| = \text{poly}(\lambda)$. Such trees also have a soundness property where a Prover must produce a succinct proof $\Pi_i$ that the hash tree was indeed implemented correctly at the $i^{th}$ step of the Turing machine computation. Once the succinctness guarantee is ensured, the prover then produces SE hashes corresponding to $(h_0, \Pi_0, \{h_{i-1}, \Pi_{i-1}, h_i, \Pi_i\}_{i \in [T]})$ along with the openings to these hashes. To summarise, the proof consists of two parts, (1) The BARG proof, and (2) A somewhere extractable hash of the witnesses. Relying on the soundness of BARG, extraction correctness property of SE hash and soundness of the Hash Tree, a User/Verifier can check if each of these T intermediate steps are indeed the correct states for P, i.e., the computation was done honestly.

However, this approach only works if User/Verifier can confirm that the inputs used for the computation by the Worker, i.e. (P, x) are indeed the correct starting values as provided by the Program Author and Input Provider. This works fine for some cases because in their setting, the User/Verifier actually knows (P, x). Unfortunately, this is not at all true in our scenario. Thus, the prior techniques cannot be implemented directly as the soundness of the BARG proof cannot provide any guarantees if there is no way for to check that the initial inputs used by the Worker are correct.

Example Embodiment. Disclosed herein is an alternate way of interpreting the computation of P on input x as the following: Consider a Circuit-Universal Turing Machine $\mathcal{TM}$ which takes as input P, x, $y$ and accepts (P, x, $y$) in $T = \tilde{O}(|P|)$ steps if $P(x) = y$. We can assume without loss of generality that $P \in \{0, 1\}^m$, $x \in \{0, 1\}^n$ and $y \in \{0, 1\}$, where m, n ≤ $2^\lambda$. Keeping this in mind, we introduce the notion of Semi-Trusted SNARGs for $\mathcal{NP}$. This new kind of SNARG is one that will work for general $\mathcal{NP}$ computations, but only with a little bit of extra help from a trusted party that knows the witness—which in our delegation scenario is Alice, who knows the witness P!

A Semi-Trusted SNARG is a tuple of algorithms: stSNARG=(Setup, TrustHash, P, V), where (1) Setup is a randomised algorithm that takes as input the security parameter and outputs a Common Random String (CRS). (2) a trusted deterministic TrustHash takes as input the (CRS, P) and outputs a digest $H_P$, (3) a deterministic prover P which takes as input CRS and (P, x, $y$), and outputs a proof $\Pi$, and (4) a deterministic verifier V which gets CRS, ($H_P$, x, $y$, $\Pi$) as input and outputs 1 if $\Pi$ is valid. It must be that $|\Pi|$ and run time of V is poly($\lambda$, log T), and P runs in time poly($\lambda$, |x|, |P|, T). A simple reduction shows that in the CRS model (or alternatively in a model where Alice chooses the CRS), existence of stSNARG implies the existence of sDel. Hence, from here onwards, our goal is to construct a Semi-Trusted SNARG for $\mathcal{NP}$.

We briefly provide an informal explanation of our construction.

Every intermediate state of the Universal Turing Machine is encoded into a succinct hash (call it $h_0, \ldots, h_T$) accompanied with succinct proofs $\{\Pi_i\}_{i \in [T]}$. The prover computes two independent copies of Somewhere Extractable (SE) hashes ($c_1, c_2$) of the encoding $\{h_0, \{(h_1, \Pi_1), \ldots, (h_T, \Pi_T)\}\}$ along with their corresponding openings. Here $h_0 = (st_0, H_P, H_x, H_{work})$ where $st_0$ is that hash of $\mathcal{TM}$'s starting state which is publicly known, $H_x$ denote the hash of x, and $H_{work}$ is the hash of $\mathcal{TM}$'s blank work tape. The use of two independent SE hashes are pivotal for soundness which we elaborate later.

We point out that TrustHash computes $H_P$ using the same hash tree which is used for hashing the Turing machine states by the Prover. This is crucial to ensure soundness of the protocol. We show in FIG. 3 that once the public hash is fixed by TrustHash, one can hard code ($y, c_1, c_2, T, H_P, H_x$) to the index circuit $C_{index}$ for BARG. V can rely upon the binding property/collision resistance of the hash to ensure that the prover has used P and x which were provided by Alice and the input provider respectively. The main observation here is that once a trusted party fixed a hash of the program P and V is convinced that computation was commenced with the correct inputs, the soundness of BARG, extraction correctness of the SE hash and soundness of hash tree ensures that the semi-trusted SNARG construction is sound.

In our proof, we choose to omit explicit use of this notion, and instead we make direct use of two independent SE hashes as mentioned above. A simple hybrid argument then gives a straightforward proof for soundness. This shows that the "anchor and step" use of SE hashes, which dates to the introduction of somewhere-binding hashes in 2015, is directly sufficient for this proof of soundness.

Zero-Knowledge In some embodiments of the delegation scenario, can be configured so that no information about P leaked to V during the delegation process. Hence, zero-knowledge guarantees can be added to our protocol. A generic transformation to modify a semi-trusted SNARG to add zero knowledge guarantees is disclosed. In order to do, so we make use of a statistically binding extractable commitment scheme and a NIZK, and make the following modifications:

- We add an additional commitment to 0 in the CRS which is never used in the proof but helps in proving zero knowledge.
- The public hash output by TrustHash is a binding commitment $C_P$ of $H_P$. It then sends (P, $H_P$) to the worker W only.
- The SE hashes $c_1$, $c_2$ are also committed as a part of the proof and not published in the open.
- The prover wraps the BARG proof Π with a NIZK proof which proves that that the BARG verification circuit indeed accepts the BARG proof.
- The Verifier then checks if the NIZK proof is valid.

The binding and hiding property of the commitment, and witness indistinguishability of NIZK guarantees zero knowledge.

1 Preliminaries

We define the underlying primitives which are used as building blocks to perform the Succinct Delegation in the setup.

Definition 1.1 (Non-Interactive Zero Knowledge(NIZK) Arguments in the CRS model). A non interactive zero knowledge argument for a language L in the Common Reference String (CRS) model is defined three PPT algorithms:

- Setup ($1^n$, $1^\lambda$) outputs a uniform random string crs given a statement of length n and security parameter $\lambda$.
- Prover P(crs, x, w) outputs a proof $\pi$ given a statement witness pair (x, w) in the NP relation R such that $|\Pi|$=poly($|x|$, $|w|$).
- Verifier V(crs, x, $\pi$) either accepts or rejects.

The following properties must be satisfied:
- Completeness: V(crs, x, $\pi$) must always accept if x∈L and $\pi$←P(crs, x, w).
- Computational Soundness: for every non-uniform poly time prover P*, there exists a negligible function $\epsilon(\lambda)$ such that for any n∈N and x∉L, $$\Pr[\text{crs} \leftarrow \text{Setup}(1^n, 1^\lambda), \pi^* \leftarrow P(\text{crs}, x), V(\text{crs}, x, \pi^*) \text{ accepts}] \leq \epsilon(\lambda).$$

- Non Interactive Zero Knowledge: There exists a PPT simulator M such that for every x∈L such that the distribution of the transcript output by Setup and P, i.e., (crs, P(crs, x, w)): crs←Setup($1^n$, $1^\lambda$) is statistically indistinguishable from the output of M(x). Note that M is allowed to generate its own CRS.

Known techniques show how to instantiate such NIZKs from LWE.

Definition 1.2 (Statistically Binding Extractable Commitment Scheme). A Statistically binding commitment scheme $\text{Com}_{bind}$ in the CRS model is a tuple of efficiently polynomial time algorithms (Gen, TGen, C, Ext), where,
- Gen($1^\lambda$, $1^N$) which on input the security parameter $\lambda$ and message length N outputs a common reference string crs.
- TGen($1^\lambda$, $1^N$) outputs a common reference string crs and trapdoor td.
- C(crs, m; r) takes as input crs, a message m to be committed, and uses randomness r to output a commitment corn such that $|c|$=poly($|m|$).
- Ext(com, td) is a deterministic algorithm which takes as input a commitment corn and trapdoor td, and outputs a message m.

They have the following properties:
- CRS indistinguishability: The distribution of crs generated by Gen and TGen must be indistinguishable.
- Statistical Binding: With high probability over the choice of crs←Setup($1^\lambda$), there does not exists $r_0$, $r_1$, and messages $m_0 \neq m_1$ such that C(crs, $m_0$; $r_0$)=C(crs, $m_1$; $r_1$).
- Computational Hiding: For messages $m_0 \neq m_1$, and randomness $r_0$, $r_1$ the distribution of (crs, $\text{com}_0$) is computationally indistinguishable from (crs, $\text{com}_1$). Here, crs←Setup($1^\lambda$), $\text{com}_0$←C(crs, $m_0$; $r_0$), and $\text{com}_1$←C(crs, $m_1$; $r_1$).
- Extraction Correctness: For any security parameter $\lambda \in \mathbb{N}$, message m, randomness r $$\Pr[((\text{crs},\text{td}) \leftarrow TGen(1^\lambda), \text{com} \leftarrow C(m,\text{crs};r)) \Rightarrow \text{EXT}(\text{com},\text{td})=m]=1.$$

Note that Ext is a deterministic algorithm, hence this property itself implies statistical binding of $\text{Com}_{bind}$.

Given a commitment com and crs, a valid corresponding pair (m, r) is known as the opening for com.

Any public key encryption scheme from LWE can be used to construct a Statistically Binding Extractable Commitment Scheme.

1.1 Somewhere Extractable Hash

Somewhere Statistically Binding (SSB) Hashes were introduced in prior work and have been extensively used. An SSB hash works in two modes, namely, (1) normal mode where the key is generated uniformly at random and (2) the trapdoor mode where the key is generated according to a subset S denoting some bits of the message to be hashed. An extension of SSB hashes are somewhere extractable (SE) hashes. Formally, a somewhere extractable (SE) hash is a tuple of algorithms (Gen, TGen, Hash, Open, Verify, Ext) described below:

- SE.Gen($1^\lambda$, $1^N$, $1^{|S|}$): On input the security parameter, message length N, and the size of a subset S⊆[N], the "normal mode" key generation outputs a uniformly random key K.
- SE.TGen($1^\lambda$, $1^N$, S): On input the security parameter, message length and a subset S⊆[N], the "trapdoor mode" key generation algorithm outputs a hash key K* and a trapdoor td.
- SE.Hash(K, m∈$\{0, 1\}^N$): On input the hash key K, and vector m=($m_1$, . . . , $m_N$), outputs a hash h.
- SE.Open(K, m, i): On input the hash key K, vector m=($m_1$, . . . , $m_N$), and an index i∈[N], it outputs an opening $\pi_i$ to $m_i$.
- SE.Verify(K, h, $m_i$, i, $\pi_i$): On input the hash key K, a hash h, a bit $m_i \in \{0, 1\}$, and a local opening $\pi_i$, the verification algorithm either accepts (output 1) or rejects (output 0) the local opening.
- SE.Ext(h, td): On input a hash h and trapdoor td generated by TGen with respect to the subset S, the deterministic extraction algorithm outputs an extraction string $m^*_S$ on the subset S.

Furthermore, we need the SE Hash to have the following properties:

Succinct Key. The size of the key is bounded by poly($\lambda$, |S|, log N).

Succinct Hash. The hash size is bounded by poly($\lambda$, |S|, log N).

Succinct Local Opening. The size of the local opening $\pi_i \leftarrow \text{Open}(K, m, i)$ is bounded by poly($\lambda$, |S|, log N).

Succinct Verification. The running time of the verification algorithm is bounded by poly($\lambda$, |S|, log N).

Key Indistinguishability. For any non-uniform PPT adversary $\mathcal{A} := (\mathcal{A}_1, \mathcal{A}_2)$ and any polynomial N=N($\lambda$), there exists a negligible function $\nu(\lambda)$ such that $$|\Pr[\mathcal{A}_2(K)=1|S \leftarrow \mathcal{A}_1(1^\lambda, 1^N), K \leftarrow \text{Gen}(1^\lambda, 1^N, 1^{|S|})] -$$
$$\Pr[\mathcal{A}_2(K^*)=1|S \leftarrow \mathcal{A}_1(1^\lambda, 1^N), (K^*, \text{td}) \leftarrow T\text{Gen}(1^\lambda, 1^N, S)]| \leq \nu(\lambda).$$

Opening Completeness. For any hash key K, any message $m = (m_1, \ldots, m_N)$, and index i, we have $$\Pr[\text{Verify}(K^*, h, m_{i^*}, i^*, \pi_{i^*}) = 1 | h \leftarrow \text{Hash}(K, m), \pi_{i^*} \leftarrow \text{Open}(K, m, i)] = 1.$$

Extraction Correctness. For any subset $S \subseteq [N]$, any trapdoor key $(K^*, \text{td}) \leftarrow T\text{Gen}(1^\lambda, 1^N, S)$, any hash h, index $i \in S$, bit $m_{i^*}$ and proof $\pi_{i^*}$, we have, $$\Pr[\text{Verify}(K^*, h, m_{i^*}, i^*, \pi_{i^*}) = 1 \Rightarrow \text{Ext}(h, \text{td})|_{i^*} = m_{i^*}] = 1.$$

We point out that this is indeed the somewhere statistical binding property of the hash as Ext(h, td) is a deterministic function, hence the uniqueness of the extraction ensures binding of the hash.

1.2 Non Interactive Batch Arguments (BARG) for Index Language

Definition 1.3 (Circuit Satisfiability Language). We define the language SAT=$\{(C, x) | \exists w \text{ such that } C(x, w) = 1\}$, where $C: \{0, 1\}^n \times \{0, 1\}^m \to \{0, 1\}$ is a boolean circuit, and $x \in \{0, 1\}^n$ is an instance.

A non interactive BARG for SAT involves a prover and verifier having as common input a circuit C, and a series of T instances $x_1, \ldots, x_T$. The prover then sends a single message to the verifier with a proof that $(C, x_1), \ldots, (C, x_T) \in \text{SAT}$. In particular, a non interactive BARG has a tuple of four algorithms (Gen, TGen, Prove, Verify) that are defined as follows:

Gen($1^\lambda$, $1^T$, $1^{|C|}$): On input security parameter $\lambda$, number of instances and size of circuit, the CRS generation algorithm outputs a uniformly sampled crs.

TGen($1^\lambda$, $1^T$, $1^{|C|}$, i*): On input the security parameter, number of instances, size of circuit and an index i*, the trapdoor CRS generation algorithm outputs crs*.

Prove(crs, C, $x_1, \ldots, x_T, w_1, \ldots, w_T$): On input crs, circuit C, list of T instance and their corresponding witnesses, the prover outputs a proof $\pi$.

Verify(crs, C, $x_1, \ldots, x_T, \pi$): On input crs, circuit C, list of T instances and proof $\pi$, the verifier decides to accept (output 1) or reject(output 0) the proof.

BARGs satisfy the following properties:

Succinct Communication. Size of $\pi$ is bounded by poly($\lambda$, log T, |C|).

Compact CRS. The crs size is bounded by poly($\lambda$, log T, |C|).

Succinct Verification. Verification algorithm runs in time poly($\lambda$, log T, |C|)+poly($\lambda$, log T+n).

CRS indistinguishability. For any non-uniform PPT adversary $\mathcal{A} := (\mathcal{A}_1, \mathcal{A}_2)$ and any polynomial T=T($\lambda$), there exists a negligible function $\nu(\lambda)$ such that $$|\Pr[\mathcal{A}_2(\text{crs})=1|i^* \leftarrow \mathcal{A}_1(1^\lambda, 1^T), \text{crs} \leftarrow \text{Gen}(1^\lambda, 1^T)] -$$
$$\Pr[\mathcal{A}_2(\text{crs}^*)=1|i^* \leftarrow \mathcal{A}_1(1^\lambda, 1^T), \text{crs}^* \leftarrow T\text{Gen}(1^\lambda, 1^T, i^*)]| \leq \nu(\lambda).$$

Corollary 1.4. As a direct consequence of CRS indistinguishability, we have that for any non-uniform PPT adversary $\mathcal{A} := (\mathcal{A}_1, \mathcal{A}_2)$ and any polynomial T=T($\lambda$), and $i \neq j$, there exists a negligible function $\nu(\lambda)$ such that $$|\Pr[\mathcal{A}_2(\text{crs}^i)=1|i^* \leftarrow \mathcal{A}_1(1^\lambda, 1^T), \text{crs}^i \leftarrow T\text{Gen}(1^\lambda, 1^T, i)] - \Pr[\mathcal{A}_2(\text{crs}^j)=1|j \leftarrow \mathcal{A}_1(1^\lambda, 1^T), \text{crs}^{j^*} \leftarrow T\text{Gen}(1^\lambda, 1^T, j)]| \leq \nu(\lambda).$$

Completeness. For any circuit C, T instances $x_1, \ldots, x_T$ such that $(C, x_1), \ldots, (C, x_T) \in \text{SAT}$ and witnesses $w_1, \ldots, w_T$ corresponding to respective instance, we have, $$\Pr[\text{Verify}(\text{crs}, C, x_1, \ldots, x_T, \pi)=1|\text{crs} \leftarrow \text{Gen}(1^\lambda, 1^T, 1^{|C|}), \pi \leftarrow \text{Prove}(\text{crs}, C, x_1, \ldots, x_T, w_1, \ldots, w_T)] = 1.$$

Semi-Adaptive Somewhere Soundness. For any non-uniform PPT adversary $\mathcal{A}$ and any polynomial T=T($\lambda$), there exists a negligible function $\nu(\lambda)$ such that $$\Pr[i^* \in [T] \wedge (C, x_{i^*}) \notin \text{SAT} \wedge \text{Verify}(\text{crs}^*, C, x_1, \ldots, x_T, \pi)$$
$$= 1 | i^* \leftarrow \mathcal{A}(1^\lambda, 1^T), \text{crs}^* \leftarrow T\text{Gen}(1^\lambda, 1^T, i^*),$$
$$(C, x_1, \ldots, x_T, \pi) \leftarrow \mathcal{A}(\text{crs}^*)] \leq \nu(\lambda).$$

Somewhere Argument of Knowledge. There exists a PPT extractor E such that, for any non uniform PPT adversary $\mathcal{A}$, and any polynomial T, there exists a negligible function $\nu(\lambda)$ such that $$|\Pr[C(x_{i^*}, w)=1|i^* \leftarrow \mathcal{A}(1^\lambda, 1^T), \text{crs}^* \leftarrow \mathbb{E}(1^\lambda, 1^T, i^*)(C, x_1, \ldots, x_T, \pi) \leftarrow \mathcal{A}(\text{crs}^*), w \leftarrow E(C, x_1, \ldots, x_T, \pi)] - \Pr[\text{Verify}(\text{crs}, C, x_1, \ldots, x_T, \pi)=1|i^* \leftarrow \mathcal{A}(1^\lambda, 1^T), \text{crs} \leftarrow \text{Gen}(1^\lambda, 1^T), (C, x_1, \ldots, x_T, \pi) \leftarrow \mathcal{A}(\text{crs})]| \leq \nu(\lambda).$$

In addition to this, crs* must be computationally indistinguishable from crs.

Definition 1.5 (Index Language). We define an Index Language as the following:

$$\mathcal{L}^{\text{index}} = \{(C, i) | \exists w, \text{ such that } C(i, w) = 1\},$$

where C is a boolean function and i is an index.

Note that non interactive batch arguments for index language is a special case of non interactive BARGs for circuit satisfiability when the instances $(x_1, \ldots, x_T)$ are indices $(1, \ldots, T)$. In this case, one removes the instances from input to the prover and verifier algorithm. Since, the verifier does not read the instances, it reduces the succinct verification time to poly($\lambda$, log T, |C|).

1.3 Hash Tree

To enable Turing Machine Delegation when the state space is unbounded, we use the notion of Hash Tree. Formally, a hash tree consists of a tuple of six algorithms:

HT.Gen($1^\lambda$): On input security parameter $\lambda$, outputs a hash key dk.

HT.Hash(dk, D): On input the hash key and a string $D \in \{0, 1\}^L$, outputs the hash tree tree and its root rt.

HT.Read (tree, l): On input the hash tree and a memory location $l \in [2^\lambda]$, it outputs a bit b that is read from $l^{th}$ location of the string corresponding to the tree and a proof $\pi$.

HT.Write(tree, l, b): On input the hash tree, a memory location $l \in [L+1]$ and bit b, it outputs a new tree tree', root rt' along with a proof $\pi$'.

HT.VerRead(dk, rt, l, b, $\pi$): On input the hash key dk, hash tree root rt, memory location l, bit b and proof $\pi$, outputs 0 or 1 to reject or accept the proof that b is indeed the correct bit read at location l.

HT.VerWrite(dk, rt, l, b, rt', π'): On input hash key dk, tree root rt', memory location l, bit b, new root rt' an proof π, either accepts (output 1) or rejects (output 0) the proof.

A hash tree scheme must satisfy the following properties:

Completeness of Read. For every $\lambda \in \mathbb{N}$, $D \in \{0, 1\}^L$ such that $L<2^\lambda$ and $l\in[L]$, $$\Pr[\text{HT.VerRead}(dk,rt,l,b,\pi)=1 \wedge D[l]=b | dk \leftarrow \text{HT.Gen}(1^\lambda),(\text{tree},rt):=\text{HT.Hash}(dk,D),(b,\pi):=\text{HT.Read}(\text{tree},l)]=1.$$

Completeness of Write. For every $\lambda \in \mathbb{N}$, $D \in \{0, 1\}^L$ such that $L<2^\lambda$, $l\in[L+1]$, $b\in\{0, 1\}$. Further if $l\leq L$. then let D' be the string D with its $l^{th}$ location set to b, otherwise let D' be the string D appended with b at the end, i.e., D'=D∥b). Then, $$\Pr[\text{HT.VerWrite}(dk,rt,l,b,rt',\pi)=1 \wedge (\text{tree}',rt')=\text{HT.Hash}(dk,D') | dk \leftarrow \text{HT.Gen}(1^\lambda),(\text{tree},rt):=\text{HT.Hash}(dk,D),(\text{tree}',rt',\pi):=\text{HT.Write}(\text{tree},l,b)]=1.$$

Efficiency. The running time of HT.Hash is $|D|\cdot\text{poly}(\lambda)$. The length of the root rt and proofs produced by HT.Read and HT.Write are $\text{poly}(\lambda)$.

Soundness of Read. For every polynomial size adversary $\mathcal{A}$, there exists a negligible function $\text{negl}(\lambda)$ such that for every $\lambda$, we have $$\Pr[b_1 \neq b_2, \text{HT.VerRead}(dk,rt,l,b_1,\pi)=1, \text{HT.VerRead}(dk,rt,l,b_2,\pi_2)=1 | dk \leftarrow \text{HT.Gen}(1^\lambda),(rt,l,b_1,\pi_1,b_2,\pi_2) \leftarrow \mathcal{A}(dk)] \leq \text{negl}(\lambda).$$

Soundness of Write. For every polynomial size adversary $\mathcal{A}$, there exists a negligible function $\text{negl}(\lambda)$ such that for every $\lambda$, we have $$\Pr[rt_1 \neq rt_2, \text{HT.VerWrite}(dk,rt,l,b,rt_1,\pi_1)=1, \text{HT.VerWrite}(dk,rt,l,b,rt_2,\pi_2)=1 | dk \leftarrow \text{HT.Gen}(1^\lambda),(rt,l,b,rt_1,\pi_1,rt_2,\pi_2) \leftarrow \mathcal{A}(dk)] \leq \text{negl}(\lambda).$$

Theorem 1.6 (Existence of hash trees). A hash tree scheme as defined above can be efficiently constructed from any collision resistant hash function.

2 Publicly Verifiable Non Interactive Succinct Delegation

We formally define the notion of Publicly Verifiable Non Interactive Succinct Delegation (sDel). Such a delegation scheme in the CRS model involves the following PPT algorithms, (1) Software/Program Author ProgAuth (2) Cloud Worker W, and (3) Verifier V An sDel comprises of the following polynomial time algorithms:

sDel.Setup($1^\lambda$): A randomized setup algorithm which on input security parameter $\lambda$ and outputs crs.

sDel.ProgAuth($1^\lambda$, crs): A program author which takes as input $\lambda$, outputs a (not public) program $P\in\{0, 1\}^m$, $m\leq 2^\lambda \in \mathbb{N}$, state and a public digest $H_P$.

sDel.W(crs, P, state, $H_P$, x): A deterministic cloud worker which on input crs, program P, input $x\in\{0, 1\}^n$, $n\leq 2^\lambda \in \mathbb{N}$ outputs a value y and proof Π.

sDel.V(crs, x, $y$, $H_P$, Π): A deterministic verifier which on input crs, digest $H_P$, x, $y$, Π either accepts or rejects.

A publicly verifiable succinct delegation scheme (sDel.Setup, sDel.ProgAuth, s Del.W, sDel.V) satisfies the following properties:

Completeness. For every $\lambda$, n, $m\in\mathbb{N}$, and for all $x\in\{0, 1\}^n$ such that n, $m<2^\lambda$, and $P(x)=y$, we have $$\Pr[\text{sDel}.V(\text{crs},x,\mathcal{Y},H_P,\Pi)=1 | \text{crs} \leftarrow \text{sDel.Setup}(1^\lambda),((P,\text{state})H_P) \leftarrow \text{sDel.ProgAuth}(1^\lambda,\text{crs}),(\mathcal{Y},\Pi) \leftarrow \text{sDel}.W(\text{crs},P,\text{state},H_P,x)]=1.$$

Efficiency. sDel.Setup runs in time $\text{poly}(\lambda)$, sDel.W runs in time $\text{poly}(\lambda, |P|, |x|)$ and outputs a proofs of length $\text{poly}(\lambda, \log |P|, \log |x|)$, and sDel.V runs in time $\text{poly}(\lambda, \log |P|, \log |x|)$.

Soundness. For every PPT adversary $\mathcal{A}:=(\mathcal{A}_1, \mathcal{A}_2)$ and the tuple $n=n(\lambda)$, $m=m(\lambda)$, there exists a negligible function $\text{negl}(\lambda)$ such that for every $\lambda \in \mathbb{N}$, $$\Pr[\text{sDel}.V(\text{crs},x,\mathcal{Y},H_P,\Pi)=1 \wedge P(x)\neq \mathcal{Y} | \text{crs} \leftarrow \text{sDel.Setup}(1^\lambda),((P,\text{state}),H_P) \leftarrow \text{sDel.ProgAuth}(1^\lambda,\text{crs}),(x,\text{aux}) \leftarrow \mathcal{A}_1(1^\lambda,\text{crs}),(\mathcal{Y},\Pi) \leftarrow \mathcal{A}_2(\text{crs},P,\text{state},H_P,x,\text{aux})] \leq \text{negl}(\lambda).$$

To construct sDel, we introduce a notion of Semi-Trusted Succinct Non-Interactive Arguments stSNARG which we formally introduce and construct in Section 3. After that, we prove the following lemma which shows how to construct sDel using stSNARG as a building block.

Lemma 2.1. Assuming T=poly(m, n), T, m, $n\leq 2^\lambda$, the stSNARG protocol in FIG. 2 implies the unconditional existence of a publicly verifiable non interactive succinct delegation scheme sDel as defined above.

2.1 sDel with Zero-Knowledge

A publicly verifiable non interactive succinct delegation scheme with zero knowledge zk-sDel is defined by the following efficient algorithms:

zk-sDel.Setup($1^\lambda$): A randomized setup algorithm which on input security parameter $\lambda$ and outputs crs.

zk-sDel.ProgAuth($1^\lambda$, crs): A program author which takes as input $\lambda$, generates a program $P\in\{0, 1\}^m$, $m\leq 2^\lambda \in \mathbb{N}$. Additionally, it computes a digest $H_P$ and creates a statistically binding and extractable commitment $C_P$ of $H_P$ under randomness r. Finally it sends a private output (P, state) and public output $C_P$. Here state contains the randomness r and $H_P$ encoded in it along with any other state information.

zk-sDel.W(crs, P, state, $C_P$, x): A deterministic cloud worker which on input crs, program P, commitment $C_P$, $x\in\{0, 1\}^n$, $n\leq 2^\lambda \in \mathbb{N}$ outputs a value $y$ and proof Π.

zk-sDel.V(crs, x, $y$, $C_P$, Π): A deterministic verifier which on input (crs, $C_P$, x, $y$, Π) either accepts or rejects.

Apart from the Completeness, Efficiency and Soundness guarantees mentioned above, a publicly verifiable succinct delegation scheme (zk-sDel.Setup, zk-sDel.ProgAuth, zk-sDel.W, zk-sDel.V) satisfies the following additional property:

Non Interactive Zero Knowledge. For all $\lambda$, n, $m\in\mathbb{N}$ such that n, $m\leq 2^\lambda$, $x\in\{0, 1\}^n$ and $y\in\{0, 1\}$, such that $P(x)=y$ there exists a PPT simulator $\text{Sim}:=(\text{Sim}_1, \text{Sim}_2)$ such that the distributions of $$(\text{crs},x,\mathcal{Y},C_P,\Pi) | (\text{crs},\text{aux}) \leftarrow \text{Sim}_1(1^\lambda),((P,\text{state}),C_P) \leftarrow \text{zk-sDel.ProgAuth}(1^\lambda,\text{crs},\text{aux}),(\mathcal{Y},\Pi) \leftarrow \text{Sim}_2(\text{aux},\text{crs},x,C_P)$$

and $$(\text{crs},x,\mathcal{Y},C_P,\Pi) | \text{crs} \leftarrow \text{zk-sDel.Setup}(1^\lambda),((P,\text{state}),C_P) \leftarrow \text{zk-sDel.ProgAuth}(1^\lambda,\text{crs}),(\mathcal{Y},\Pi) \leftarrow \text{zk-sDel}.W(\text{crs},P,\text{state},x,C_P)$$

are indistinguishable.

In Section 4, we present a generic construction of a semi trusted non-interactive succinct arguments with zero-knowledge (ZKstSNARG) from stSNARG.

Corollary 2.2. Assuming T=poly(m, n), T, m, n≤$2^\lambda$, the ZKstSNARG protocol in FIG. 5 implies the unconditional existence of a publicly verifiable non interactive succinct delegation scheme with zero knowledge.

3 Semi-Trusted Succinct Non-Interactive Argument (stSNARG)

We introduce a notion of "Semi-Trusted" SNARGs which is similar to the general definition of SNARGs with an addition "trusted" polynomial time algorithm that outputs a hash for the witness. Further, we provide an explicit construction of an stSNARG for all of NP. Note that any SNARG for arbitrary NP language $\mathcal{L}$ can be reformulated as a Turing Machine which takes in as input an instance x along with witness w and accepts x, w in T steps if $x \in \mathcal{L}$. In this work, we modify the definition by using a Universal Turing Machine $\mathcal{TM}$ which takes as input an instance (x, $y$), a witness which is a program P and accepts (P, x, $y$) in T steps if P(x)=$y$. We formalise this notion as follows:

Let $\mathcal{TM}$ be a Universal Turing Machine which takes as input a program P∈ {0, 1}$^m$ for some m<$2^\lambda$, and x∈ {0, 1}$^n$ for some n<$2^\lambda$ and $y\in$ {0, 1} which serve as an input and output for P respectively. $\mathcal{TM}$ accepts (P, x, $y$) in T steps if P(x)=$y$. A prover produces a proof Π to convince a verifier that $\mathcal{TM}$ accepts P, x, $y$ in T. A publicly verifiable semi-trusted SNARG (stSNARG) for $\mathcal{TM}$ has the following polynomial time algorithms:

- stSNARG.Setup($1^\lambda$, $1^T$): A randomized setup algorithm which on input security parameter λ, and number of Turing Machine steps T, outputs crs.
- stSNARG.TrustHash(crs, P): A deterministic and honest algorithm which on input crs and a program P∈ {0, 1}$^m$ for some m<$2^\lambda$, outputs a succinct and public digest $H_P$ of P corresponding to crs.
- stSNARG.P(crs, P, x, $y$, $H_P$): A deterministic prover algorithm which on input the crs, P∈ {0, 1}$^m$ for some m<$2^\lambda$, x∈ {0, 1}$^n$ for some n<$2^\lambda$, $y\in$ {0, 1} and the digest $H_P$ outputs a proof Π.
- stSNARG.V(crs, x, $y$, $H_P$, Π): A deterministic verification algorithm which on input crs, x, $y$, digest $H_P$ and proof Π, either accepts(output 1) or rejects(output 0) it.

Remark 3.1. We often abuse notation and use (c, Π) to denote a proof. This can be done without loss of generalization by defining a new proof Π'=(c||Π).

A Universal Turing Machine $\mathcal{TM}$ on input (P, x, $y$) outputs 1 if it accepts (P, x, $y$) within T steps. We define the $\mathcal{NP}$ language $\mathcal{L}_{\mathcal{TM}}$ as, $$\mathcal{L}_{\mathcal{TM}} := \{(P,x, \mathcal{Y},T,H_P,\text{crs}) | \mathcal{TM}(P,x, \mathcal{Y})=1 \wedge \text{stSNARG.TrustHash(crs,P)}=H_P\}.$$

A publicly verifiable stSNARG scheme (stSNARG.Setup, stSNARG.TrustHash, stSNARG.P, stSNARG.V) satisfies the following properties:

Completeness. For every λ, T, n, m∈ ℕ such that T, n, m<$2^\lambda$, program P∈ {0, 1}$^m$, input x∈ {0, 1}$^n$ and output $y\in$ {0, 1} such that (P, x, $y$, T, $H_P$, crs)∈ $\mathcal{L}_{\mathcal{TM}}$, we have Pr[stSNARG.V(crs,x, $\mathcal{Y}$,$H_P$,Π)=1|crs←stSNARG-
.Setup($1^\lambda$,$1^T$),$H_P$←stSNARG.TrustHash(crs,P),
Π←stSNARG.P(crs,P,x, $\mathcal{Y}$,$H_P$)]=1.

Efficiency. stSNARG.Setup runs in time poly(λ, T), stSNARG.TrustHash runs in time poly(λ, |P|, T), stSNARG.P runs in time poly(λ, |x|, |P|, T) and outputs a proofs of length poly(λ, log T), and stSNARG.V runs in time poly(λ, log T).

Soundness. For every PPT adversary $\mathcal{A}$ :=($\mathcal{A}_1$, $\mathcal{A}_2$) and the tuple T=T(λ),n=n(λ), m=m(λ), there exists a negligible function negl(λ) such that for every λ∈ ℕ, Pr[stSNARG.V(crs,x,y,$H_P$,Π)=1∧(P,x, $\mathcal{Y}$,T,$H_P$,crs)∉
$\mathcal{L}_{\mathcal{TM}}$ |,crs←stSNARG.Setup($1^\lambda$,$1^T$),(P,aux)←
$\mathcal{A}_1$($1^\lambda$,crs),$H_P$stSNARG.TrustHash(crs,P),(x,y,
Π)←$\mathcal{A}_2$(crs,P,$H_P$,aux)]≤negl(λ).

3.1 Example Construction

Herein, we use the notion of non-interactive BARG for index language and SE Hash functions in our scheme.

Setup for Universal Turing Machine. For a cleaner analysis, we assume without loss of generality that $\mathcal{TM}$ consists of three tapes, namely, $Tp_1$, $Tp_2$, $Tp_3$. $Tp_1$ and $Tp_2$ are read only tapes that store x and P respectively. $Tp_3$ is the work tape which is initialized with □ to denote an empty string.

Transition steps for $\mathcal{TM}$. $\mathcal{TM}$'s state information along with the head locations of the three tapes are encoded as st. To handle Turing Machines with arbitrarily long tapes, we encode $\{Tp_i\}_{i\in[3]}$ using three Hash Trees as defined herein and produce tree roots $rt^1$, $rt^2$, $rt^3$ respectively.

Let the each intermediate transition state of $\mathcal{TM}$ be encoded as $h_i:=(st_i, rt_i^1, rt_i^2, rt_i^3)$ for i∈ [T]. A single step of $\mathcal{TM}$ can be interpreted in the manner described below. We break down the step function at the $i^{th}$ stage into two deterministic polynomial time algorithms:

- StepR: On input $st_{i-1}$ of $\mathcal{TM}$, outputs head positions $l_{i-1}^1$, $l_{i-1}^2$, $l_{i-1}^3$ which denote the memory locations of $Tp_1$, $Tp_2$, $Tp_3$ which $\mathcal{TM}$ in the current state $st_{i-1}$ would read from.
- StepW: On input $st_{i-1}$, and bits $b_{i-1}^1$, $b_{i-1}^2$, $b_{i-1}^3$ outputs bit b', location l' and $st_i$ such that $\mathcal{TM}$ upon reading $b_{i-1}^1$, $b_{i-1}^2$, $b_{i-1}^3$ at locations $l_{i-1}^1$, $l_{i-1}^2$, $l_{i-1}^3$ using HT.Read, would write b' at location l' of $Tp_3$, thereby transition to new state $st_i$.

Now, we translate the $i^{th}$ single step of $\mathcal{TM}$ to the circuit ϕ which is defined such that on input digests $h_{i-1}:=(st_{i-1}, rt_{i-1}^1, rt_{i-1}^2, rt_{i-1}^3)$ and $h_i:=(st_i, rt_i^1, rt_i^2, rt_i^2)$, bits $b_i^1$, $b_i^2$, $b_i^3$, and proofs $\Pi_i^1$, $\Pi_i^2$, $\Pi_i^3$, $\Pi_i'$, $\phi(h_{i-1}, h_i, b_i^1, b_i^2, b_i^3, \Pi_i^1, \Pi_i^2, \Pi_i^3, \Pi_i')$=1 if and only if the following hold:

1. $(l_i^1, l_i^2, l_i^3) \leftarrow$ StepR($st_{i-1}$)
2. (b', l', st') ← StepW($st_{i-1}$, $b_i^1$, $b_i^2$, $b_i^3$)
3. st' = $st_i$
4. HT.VerRead(dk, $rt_{i-1}^1$, $l_i^1$, $b_i^1$, $\Pi_i^1$) = 1
5. HT.VerRead(dk, $rt_{i-1}^2$, $l_i^2$, $b_i^2$, $\Pi_i^2$) = 1
6. HT.VerRead(dk, $rt_{i-1}^3$, $l_i^3$, $b_i^3$, $\Pi_i^3$) = 1
7. $rt_i^1 = rt_{i-1}^1$
8. $rt_i^2 = rt_{i-1}^2$
9. HT.VerWrite(dk, $rt_{i-1}^3$, l', b', $rt_i^3$, $\Pi_i'$) = 1

Here, dk denote the hash keys used to build the three hash trees. Note that the efficiency of hash tree implies that ϕ can be constructed such that it can represented as a formula in L=poly(λ) variables. For the T steps of $\mathcal{TM}$, we have the following formula over M=O(L·T) variables:

$$\Phi\left(h_0, \{h_i, b_i^1, b_i^2, b_i^3, \Pi_i^1, \Pi_i^2, \Pi_i^3, \Pi_i'\}_{i\in[T]}\right) = \bigwedge_{i\in[T]}$$
$$\phi(h_{i-1}, h_i, b_i^1, b_i^2, b_i^3, \Pi_i^1, \Pi_i^2, \Pi_i^3, \Pi_i')$$

We use a combination of SE Hash along with ϕ to produce the circuit for index languages (Section 1.2).

Our semi-trusted SNARG scheme is given in FIG. 2 and the corresponding index language circuit is shown as FIG. 3.

Theorem 3.2. Assuming the existence of Somewhere Extractable Hash functions, non-interactive Batch Arguments for Index Languages, and Collision Resistant Hash Trees as described herein, FIG. 2 is a publicly verifiable non-interactive semi-trusted SNARG with CRS size, proof size and verifier time poly($\lambda$, log T) and prover run time being poly($\lambda$, T).

Completeness. Here we give a sketch arguing completeness of our scheme. Our construction in FIG. 2 tells that Pr[stSNARG.$V$(crs,$x$, $\mathcal{Y}$,$H_P$,$\Pi$)=1|crs←stSNARG-
.Setup($1^\lambda$,$1^T$),$H_P$←stSNARG.TrustHash(crs,$P$),
stSNARG.$P$(crs,$P$,$x$, $\mathcal{Y}$,$H_P$)]=Pr[BARG.$V$
(BARG.crs,$C_{index}$,$\Pi$)=1|crs←stSNARG.Setup
($1^\lambda$,$1^T$),$H_P$stSNARG.TrustHash(crs,$P$),
$\Pi$stSNARG.$P$(crs,$P$,$x$, $\mathcal{Y}$,$H_P$)]

where $C_{index}$ is the index circuit as shown in FIG. 3. Observing stSNARG.P algorithm in our scheme tells it is sufficient to show that if the prover is honest, then ($C_{index}$, i)$\in \mathcal{L}_{index}$, $\forall i \in \{0\} \cup [T]$. If we can argue that this is indeed the case, then the completeness of BARG gives the desired result.

If (P, x, $\mathcal{Y}$, T, $H_P$, crs)$\in \mathcal{L}_{TM}$, then ($C_{index}$, 0)$\in \mathcal{L}_{index}$ index is trivially true by observation. Now, let us look at ($C_{index}$, 1). We start by analysing that $\phi(h_0, h_1, \{b_1^j, \Pi_1^j\}_{j \in [3]}, \Pi_1')=1$ is true. $\{rt_1^i = rt_0^i\}_{i \in [2]}$ follow from the read-only nature of tapes $Tp_1$, $Tp_2$. Since, $\{(b_1^j, \Pi_1^j) \leftarrow$HT.Read(tree$_0^j$, $1_j^j$)$\}_{j \in [3]}$, the hash tree completeness of read ensures that $\{$HT.VerRead(dk, $rt_0^i$, $1_1^i$, $b_1^i$, $\Pi_1^i$)=1$\}_{i \in [3]}$=1 and $\{Tp_i[1_1^i]=b_1^i\}_{i \in [3]}$. This along with the correctness of Turing Machine StepR function implies that $b_1^1$, $b_1^2$, $b_1^3$ are indeed the correct input for the StepW function of $\mathcal{TM}$. Finally, (tree$_1^3$, $rt_1^3$,$\Pi_1^3$)←HT.Write (tree$_0^3$, $1_1'$, $b_1'$) implies HT.VerWrite(dk, $rt_0^3$, $1'$, $b'$, $rt_1^3$, $\Pi_1'$)=1 from the hash tree completeness of write property. The same property also ensures that $Tp_3$ changes only at the $l^{th}$ memory location. When paired with the correctness of StepW, we get that $st_1$=st'

The completeness of the SE hash implies that the verification algorithm certainly accepts all the local openings. Thus, ($C_{index}$, 1)$\in \mathcal{L}^{index}$. Now, ($C_{index}$, T)$\in \mathcal{L}^{index}$ because $\mathcal{TM}$ accept (P, x, $\mathcal{Y}$) in T steps. We can show in a similar manner that for all other i, ($C_{index}$, i)$\in \mathcal{L}^{index}$. This proves the completeness of the scheme in FIG. 2.

Efficiency.

Runtime of stSNARG.Setup is poly($\lambda$, T). This follows from the efficiency of under-lying primitives.

stSNARG.TrustHash computes $H_P$ in time |P|·poly($\lambda$) which is poly(|P|, $\lambda$).

|$C_{index}$|=poly($\lambda$, log T). This follows from the efficiency of the SE hash and the efficiency of hash tree construction.

CRS Size: By the corresponding properties of the underlying primitives, |crs|=poly($\lambda$, log T).

The prover's computation time is dominated by the hashes corresponding to x, P and the Turing Machine step functions that is run T times. This requires a total time of poly($\lambda$, |x|)+poly($\lambda$, |P|)+poly($\lambda$, T)=poly($\lambda$, |P|, T).

Proof Length: |c|+$\Pi$=poly($\lambda$, log T)+poly($\lambda$, log T,|$C_{index}$|)=poly($\lambda$, log T).

Verifier Time: Time taken to compute $C_{index}$ and verify the BARG. This is poly($\lambda$, log T, |$C_{index}$|)=poly($\lambda$, log T).

4 Semi-Trusted Succinct Non-Interactive Argument with Zero Knowledge (ZK-stSNARG)

A publicly verifiable semi-trusted non interactive argument with zero-knowledge scheme ZKstSNARG: (ZKst-SNARG.Setup, ZKstSNARG.TrustHash, ZKstSNARG.P, ZKstSNARG.V) is defined as ZKstSNARG.Setup($1^\lambda$, $1^T$): A randomized setup algorithm which on input security parameter $\lambda$, and number of Turing Machine steps T, outputs crs.

ZKstSNARG.TrustHash(crs, P): A deterministic an honest algorithm which on input crs and a program P$\in\{0, 1\}^m$ for some m<$2^\lambda$, computes a succinct digest $H_P$ of P. It then produces a statistically binding and extractable commitment $C_P$ of $H_P$ under randomness $r_1$. It then gives out a pair public output POut=$C_P$ and private output SOut=($H_P$, r). Here SOut is made available to the prover only.

ZKstSNARG.P(crs, P, x, $\mathcal{Y}$, SOut, POut): A deterministic prover algorithm which on input the crs, P$\in\{0, 1\}^m$ for some m<$2^\lambda$, x$\in\{0, 1\}^n$ for some n<$2^\lambda$, $\mathcal{Y}\in\{0, 1\}$, SOut, and POut outputs a proof $\Pi$.

ZKstSNARG.V(crs, x, $\mathcal{Y}$, POut, $\Pi$): A deterministic verification algorithm which on input crs, x, $\mathcal{Y}$, public output POut of stSNARG.TrustHash and proof $\Pi$, either accepts(output 1) or rejects(output 0) it.

We define the following language $\mathcal{L}_{TM} := \{(P,x, \mathcal{Y},T,POut,crs) | \exists (H_P,r_1)$ such that
$\mathcal{TM}(P,x, \mathcal{Y})=1 \wedge (POut,(H_P,r_1))$=ZKst-SNARG.TrustHash(crs,$P$)$\}$.

A ZKstSNARG satisfies the following properties:

Completeness. For every $\lambda$, T, n, m$\in \mathbb{N}$ such that T, n, m<$2^\lambda$, program P$\in\{0, 1\}^m$, input x$\in\{0, 1\}^n$ and output $\mathcal{Y}\in\{0, 1\}$ such that (P, x, $\mathcal{Y}$, T, POut, crs)$\in \mathcal{L}_{TM}$, we have Pr[ZKstSNARG.$V$(crs,$x$, $\mathcal{Y}$,POut,$\Pi$)=1|crs←ZKst-SNARG.Setup($1^\lambda$,$1^T$),(POut,SOut))←ZKst-SNARG.TrustHash(crs,$P$),$\Pi$:=ZKstSNARG.$P$ (crs,$x$, $\mathcal{Y}$,POut,SOut)]=1.

Efficiency. ZKstSNARG.Setup runs in time poly($\lambda$, T), ZKstSNARG.TrustHash runs in time poly($\lambda$, |P|, T), ZKstSNARG.P runs in time poly($\lambda$, |x|, |P|, T) and outputs a proofs of length poly($\lambda$, log T), and ZKst-SNARG.V runs in time poly($\lambda$, log T).

Soundness. For every PPT adversary $\mathcal{A} := (\mathcal{A}_1, \mathcal{A}_2)$ and the tuple T=T ($\lambda$), n=n($\lambda$), m=m($\lambda$), there exists a negligible function negl($\lambda$) such that for every $\lambda\in\mathbb{N}$, Pr[ZKstSNARG.$V$(crs,$x$, $\mathcal{Y}$,POut,$\Pi$)=1$\wedge$($P,x, \mathcal{Y}$,$T$,
POut,SOut,crs)$\notin \mathcal{L}_{TM}$|crs←
ZKstSNARG.Setup($1^\lambda$,$1^T$),($P$,aux)←$\mathcal{A}_1$($1^\lambda$),
(POut,SOut)←ZKstSNARG.TrustHash(crs,$P$),($x$,
$\mathcal{Y}$,$\Pi$)←$\mathcal{A}_2$(crs,$P$,POut,SOut,aux)]≤negl($\lambda$).

Non Interactive Zero Knowledge. For all (P, x, $\mathcal{Y}$, T, POut, crs)$\in\mathcal{L}_{TM}$, there exists a PPT simulator Sim:= (Sim$_1$, Sim$_2$) such that the distributions of (crs,$x$, $\mathcal{Y}$,POut,$\Pi$)|(crs,aux)←Sim$_1$($1^\lambda$,$1^T$),(POut,
SOut)←ZKstSNARG.TrustHash(crs,$P$),$\Pi$←Sim$_2$
(aux,crs,($x$, $\mathcal{Y}$),POut)

and (crs,$x$, $\mathcal{Y}$,POut,$\Pi$)|crs←ZKstSNARG.Setup($1^\lambda$,$1^T$),
(POut,SOut)←ZKstSNARG.TrustHash(crs,$P$),
$\Pi$ZKstSNARG.$P$(crs,$P$,$x$, $\mathcal{Y}$,POut,SOut)

are indistinguishable.

To extend our delegation scheme to achieve non interactive zero knowledge, we use the following additional primitives, namely (1) a statistically binding extractable commitment scheme $Com_{bind}$ as defined in Section 1, and (2) a Non Interactive Zero Knowledge argument NIZK:=(NIZK.Gen, NIZK.P, NIZK.V).

The protocol in FIG. 5 demonstrates the extension of stSNARG to achieve Zero-Knowledge. The CRS in FIG. 5 contains a statistically binding commitment to 0. This lets us extend $\mathcal{L}_{\mathcal{TM}}$ to the language, $\mathcal{L}_{\mathsf{hyb}}:=\{(P,x,\mathcal{Y},T,C_P,\mathrm{crs})|\exists(H_P,r_1)$ such that
$\mathcal{TM}(P,x,\mathcal{Y})=1 \wedge (C_P,(H_P,r_1))$=ZKst-
SNARG.TrustHash(crs,$P$)$\vee$($\exists r$ such that crs contains a commitment to 1 under randomness $r$).$\}$ such that any witness to $\mathcal{L}_{\mathcal{TM}}$ is vacuously a witness to $\mathcal{L}_{\mathsf{hyb}}$ due to binding property of the commitment. We use NIZK for the following NP language:

$\mathcal{L}:=\{(c.\mathrm{com},\Pi.\mathrm{com},(\mathrm{crs},x,\mathcal{Y},T),C_P)|\exists r_1,r_2,r_3,r_4,c,\Pi,$
$H_P$ such that $(C_P$=Com.$C(\mathrm{Com}_{bind}.\mathrm{Ke}\,\mathcal{Y}_1,$
$H_P;r_1) \wedge c.\mathrm{com}=\mathrm{Com}.C(\mathrm{Com}_{bind}.$
$\mathrm{Ke}\,\mathcal{Y}_2,c;r_2) \wedge \Pi.\mathrm{com}=\mathrm{Com}.C(\mathrm{Com}_{bind}.\mathrm{Ke}\,\mathcal{Y}_3,\Pi;$
$r_3) \wedge \mathrm{stSNARG}.V(\mathrm{crs},((x,\mathcal{Y}),T,H_P),(c,\Pi))=$
$1)\vee$crs contains Com.$C(\mathrm{Com}_{bind}.\mathrm{Ke}\,\mathcal{Y}_4,1;r_4)\}$ Also, note that in this construction, the underlying stSNARG is built for the index circuit $C_{index}'$.

Theorem 4.1. Assuming the existence of semi-trusted SNARGs and Extractable Statistically Binding Commitment Schemes, and NIZK as described in sections 1 and 3, FIG. 5 is a publicly verifiable non-interactive semi-trusted SNARG with zero knowledge such that CRS size, proof size and verifier time are poly($\lambda$, log T) and prover run time is poly($\lambda$, T).

Completeness. An honest prover ignores the additional commitment to 0 in the CRS and follows FIG. 5. Also, observe that for any honest prover, any witness to an instance in $\mathcal{L}_{\mathsf{hyb}}$ is also a witness for the language $\mathcal{L}_{\mathsf{hyb}}$ with the same instance. Now, BARG.V(BARG.crs, $C_{index}'$, $\Pi$)=1 follows from the completeness of the underlying SE hash, BARG, and read and write completeness of HT as seen in the completeness proof from the previous section. Clearly, the result will follow from the completeness of the underlying NIZK.

Efficiency. The following points follow from the above lemma, and the efficiency of the SE hash and hash tree construction.

$|C_{index}'|$=poly($\lambda$,log T).

CRS Size: By the corresponding properties of the underlying primitives, $|\mathrm{crs}|$=poly($\lambda$, log T). The only addition here are the NIZK CRS and the commitment keys which are poly($\lambda$).

Proof Length: $|c.\mathrm{com}|$=$|\Pi.\mathrm{com}|$+$|\mathrm{NIZK}.\Pi|$=poly($\lambda$, log T)+poly($\lambda$, $|C_{index}'|$)+poly($\lambda$)=poly($\lambda$, log T).

Verifier Time: Time taken to compute $C_{index}'$ and verify the NIZK.

This is poly($\lambda$, log T, $|C_{index}'|$)=poly($\lambda$, log T).

System Implementations

FIG. 1 illustrates an arrangement between a User/Verifier, Worker, Input Provider, and Alice (provider of a program) implementing various embodiments described and claimed in the present disclosure. As illustrated, User/Verifier has access to a hash of the program, the output of the Worker, and the Input. Any of the components can be implemented using any of the computer systems described herein.

Figure 9:
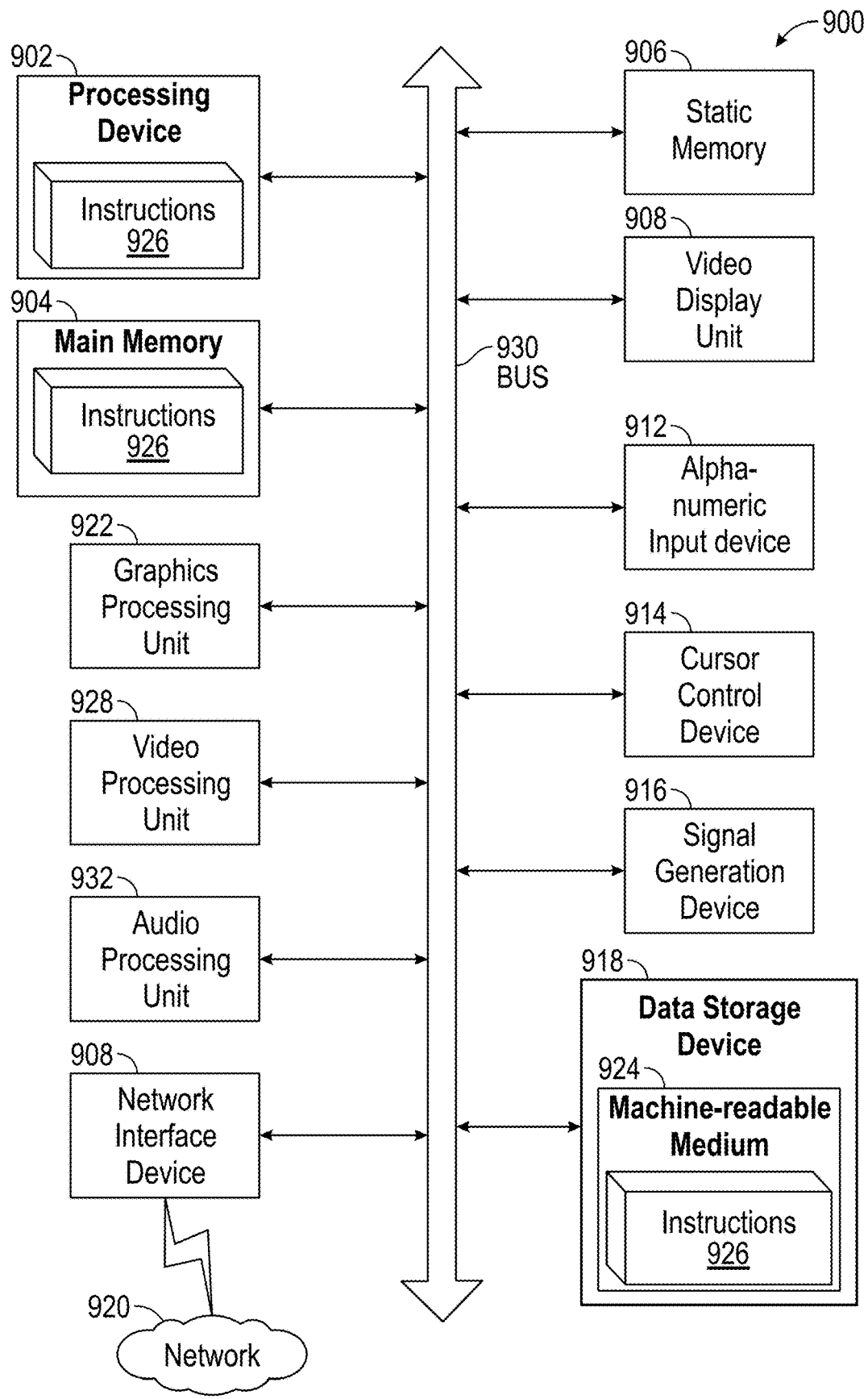
FIG. 9 illustrates further details of an example computer system architecture for implementing the claimed systems and methods.

FIGS. 8 and 9 depict example computer systems useful for implementing various embodiments described in the present disclosure. Various embodiments may be implemented, for example, using one or more computer systems, such as computer system 500 shown in FIG. 8. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity(ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 9 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 8 and 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A non-interactive method for executing a program at a remote cloud processor such that a result of a computation at a remote cloud processor is trusted, the method comprising:
    at a program provider computing device:
        creating and storing an arbitrary program;
        creating a succinct hash of the program and providing access to the hash to a remote verifier computing device;
        transmitting the program to a remote cloud processor, and not transmitting the program to the verifier;
    at an input provider computing device:
        storing an input value for use with the program;
        transmitting the input value to the remote cloud processor and the verifier;
    at the remote cloud processor:
        executing the program based on the input value to generate a result output;
        generating a proof, wherein the proof comprises a bitstring and the bitstring having a length that is polylogarithmic with a program size, and wherein the generating of the proof can be accomplished in polynomial time in the program size, and wherein the generated proof is capable of being executed by any arbitrary verifier module;

transmitting the result output and the proof to the verifier module;

at the verifier computing device:

executing a verifier routine based on the input value, the result output, the proof and the hash of the program to output a binary value representing that the remote cloud processor has generated the result output by executing the program provided by the program provider on the input provided by the input provider;

wherein the time required for the verifier routine is polylogarithmic with the program size; and wherein the verifier computing device does not have a copy of the program, and the verifier computing device is distinct from the input provider computing device and the only the value provided from the input provider computing device to the verifier computing device is the input value.

2. The method of claim 1, wherein the input provider computing device and the verifier computing device may be configured for operation by the same entity or party.

3. The method of claim 1, wherein the verifier computing device is computationally and logically distinct from the input provider computing device.

4. The method of claim 1, wherein the verifier computing device receives only the hash from program provider computing device.

5. The method of claim 1, wherein the size of the hash is either independent of a size of the program or is of a fixed size.

6. The method of claim 1, wherein the arbitrary program is represented as a non-uniform boolean circuit.

7. The method of claim 1, wherein the program provider computing device is an honest party.

8. The method of claim 1, wherein the method is configured to generate the output binary value without executing any further communication steps.

9. The method of claim 1, wherein the method is non-interactive and comprises only unidirectional communications between the program provider computing device, the input provider computing device, the remote cloud processor, and the verifier computing device.

10. A system for non-interactively executing a program at a remote cloud processor such that a result of a computation at the remote cloud processor is trusted, the system comprising:

a program provider computing device programmed to:
create and store an arbitrary program;
create a succinct hash of the program and provide access to the hash to a remote verifier computing device;
transmit the program to a remote cloud processor, and not transmit the program to the verifier computing device;

an input provider computing device programmed to:
store an input value for use with the program;
transmit the input value to the remote cloud processor and the verifier computing device;

the remote cloud processor programmed to:
execute the program based on the input value to generate a result output;
generate a proof, wherein the proof comprises a bitstring and the bitstring having a length that is polylogarithmic with a program size, and wherein the generating of the proof can be accomplished in polynomial time in the program size, and wherein the generated proof is capable of being executed by any arbitrary verifier module;
transmit the result output and the proof to the verifier computing device;

the verifier computing device programmed to:
execute a verifier routine based on the input value, the result output, the proof and the hash of the program to output a binary value representing that the remote cloud processor has generated the result output by executing the program provided by the program provider on the input provided by the input computing device;
wherein the time required for the verifier routine is polylogarithmic with the program size; and
wherein the verifier computing device does not have a copy of the program, and the verifier computing device is distinct from the input provider computing device and the only the value provided from the input provider computing device to the verifier computing device is the input value.

11. The system of claim 10, wherein the input provider computing device and the verifier computing device may be configured for operation by the same entity or party.

12. The system of claim 10, wherein the verifier computing device is computationally and logically distinct from the input provider computing device.

13. The system of claim 10, wherein the verifier computing device receives only the hash from program provider computing device.

14. The system of claim 10, wherein the size of the hash is either independent of a size of the program or is of a fixed size.

15. The system of claim 10, wherein the arbitrary program is represented as a non-uniform boolean circuit.

16. The system of claim 10, wherein the program provider computing device is an honest party.

17. The system of claim 10, wherein the system is configured to generate the output binary value without executing any further communication steps.

18. The system of claim 10, wherein the system is non-interactive and comprises only unidirectional communications between the program provider computing device, the input provider computing device, the remote cloud processor, and the verifier computing device.

* * * * *